C. C. & J. H. RUFF.
NUT LOCK.
APPLICATION FILED MAY 8, 1908.
916,201.
Patented Mar. 23, 1909.
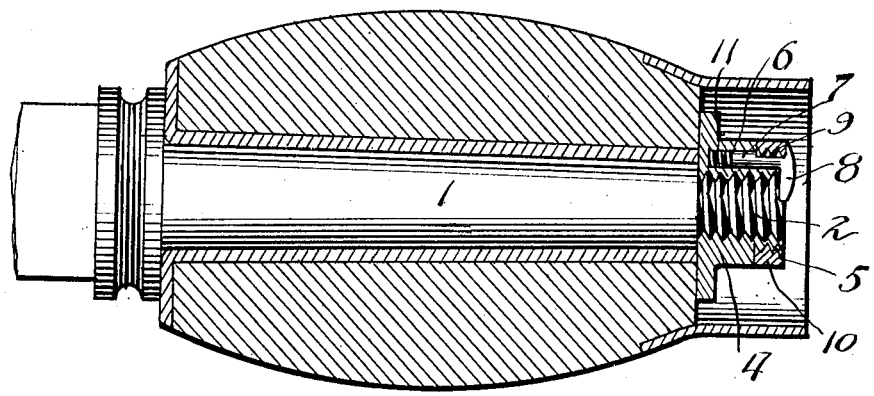
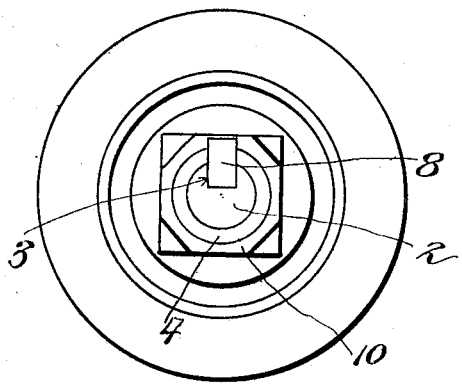
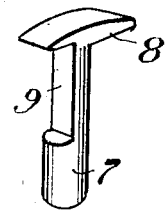
Witnesses
Hugh H. Ott
[signature]
Inventors
Charlie C. Ruff,
John H. Ruff,
By Victor J. Evans
Attorney

UNITED STATES PATENT OFFICE.

CHARLEY C. RUFF AND JOHN H. RUFF, OF LAKE CREEK, TEXAS.

NUT-LOCK.

No. 916,201.　　　Specification of Letters Patent.　　　Patented March 23, 1909.

Application filed May 8, 1908. Serial No. 431,589.

*To all whom it may concern:*

Be it known that we, CHARLIE C. RUFF and JOHN H. RUFF, citizens of the United States, residing at Lake Creek, in the county of Delta and State of Texas, have invented new and useful Improvements in Lock-Nuts, of which the following is a specification.

This invention relates to lock nuts, primarily intended for use in securing nuts upon vehicle axles, but susceptible to other uses, and the object of the invention is to produce a device of this character which may be readily and easily applied to securely lock a nut upon a bolt, and which may be readily removed when it is desired to disengage the nut from the bolt.

To these ends the invention consists in providing a bolt with a depression or cut away portion upon its face, the nut therefore having a reduced extension provided with exterior threads and having a longitudinal bore, a second nut for the extension and a sliding key for the bore, the key being provided with a cut away portion for the reception of the second nut and having a head adapted for engagement with the depression provided in the face of the bolt.

In the accompanying drawings, Figure 1 is a longitudinal sectional view of the device, illustrating the same in applied position upon the axle of a vehicle. Fig. 2 is a front elevation of Fig. 1. Fig. 3 is a perspective view of the locking element or key.

In the accompanying drawings the improved lock nut is illustrated in connection with a vehicle axle, but it is to be understood that the device is not limited to this particular use, as it may be applied with equal efficiency upon other devices.

In the drawings the numeral 1 designates a vehicle axle, provided with a reduced threaded extremity 2. This extremity 2 has its face provided with a depression or cut away portion 3, the purpose of which will hereinafter be described. Secured upon the threaded extension 2 of the axle 1 is a nut 4. This nut 4 is provided with a reduced threaded extension 5 terminating at the outer face of the nut. The nut 4 is also provided with a longitudinally extending bore 6, terminating a suitable distance away from the inner face of the nut. This bore 6 is adapted for the reception of one arm of a sliding key 7. This key 7 is provided with a depending finger 8, adapted to engage the depression 3 upon the threaded extremity of the axle 1, and the key is also provided with a depression or cut away portion 9, of a width approximately equaling that of the reduced threaded extremity 5 of the nut 4. A locking nut 10 is employed. This nut 10 is of a width equaling that of the threaded extremity 5, of the nut 4, and the cut away portion 9 of the key 7, both of which the locking nut is adapted to engage.

In securing a nut upon a bolt with the present improvement, the nut 4 is first positioned upon the threaded extension 2, the reduced portion 9 of the key 7 engaged upon the lock nut 10, the body of the key positioned in alinement with the bore 6 of the nut 4, the lock nut 10 rotated upon the threaded portion 5 of the nut 4, thus forcing the body of the key 7 within the bore and the finger 8 into engagement with the depression or cut away portion provided upon the face of the threaded extension 2 of the axle. In order to provide for the ready withdrawal of the key, a helical spring 11 is positioned between the key 7 and the face of the bore 6, thus materially aiding in the disengagement of the locking nut 10 from the threads 5 of the nut 4.

Having thus fully described the invention what is claimed as new is:

1. The combination with a threaded bolt having its face provided with a depression, a nut for the bolt, said nut being provided with a reduced threaded extension and having a longitudinal bore, a key for the bore having a longitudinal cut away portion to provide a shoulder and an angularly arranged finger, and a locking nut adapted to engage the shoulder of the key and the reduced threaded extremity of the nut to force the body of the key into the bore of the nut and the finger of the key into the recess or depression provided upon the face of the bolt.

2. The combination with a threaded bolt having its face provided with a depression, a nut for the bolt, said nut being provided with a reduced threaded extension and having a longitudinal bore, a helical spring within the bore, a key for the bore, said key being provided with a longitudinal cut away portion to provide a shoulder and an angularly extending finger, and a locking nut adapted to engage the shoulder of the key and to be rotated upon the threaded extension of the nut to force the key into the bore of the nut against the spring and the finger into engagement with the depression upon the face of the bolt.

In testimony whereof we affix our signatures in presence of two witnesses.

CHARLEY C. RUFF.
JOHN H. RUFF.

Witnesses:
DANIEL B. WESTERMAN,
HENRY L. COMBS.